US012096312B2

(12) United States Patent
Jellison, Jr.

(10) Patent No.: US 12,096,312 B2
(45) Date of Patent: *Sep. 17, 2024

(54) TRANSFERRING CONTENT TO OTHER MEDIA STATIONS

(71) Applicant: iHeartMedia Management Services, Inc., San Antonio, TX (US)

(72) Inventor: David C. Jellison, Jr., Ogallala, NE (US)

(73) Assignee: iHeart Media Management Services, Inc., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/497,413

(22) Filed: Oct. 8, 2021

(65) Prior Publication Data

US 2022/0030396 A1    Jan. 27, 2022

Related U.S. Application Data

(63) Continuation of application No. 16/575,604, filed on Sep. 19, 2019, now Pat. No. 11,146,920, which is a continuation of application No. 15/700,419, filed on Sep. 11, 2017, now Pat. No. 10,462,613, which is a continuation of application No. 13/857,213, filed on Apr. 5, 2013, now Pat. No. 9,781,576.

(51) Int. Cl.
    *H04W 4/06*    (2009.01)

(52) U.S. Cl.
    CPC ................... *H04W 4/06* (2013.01)

(58) Field of Classification Search
    CPC .................. H04W 4/06; H04W 76/40
    See application file for complete search history.

(56) References Cited

U.S. PATENT DOCUMENTS

| | | | | |
|---|---|---|---|---|
| 5,430,738 | A * | 7/1995 | Tsuda ................. | H04L 9/40 714/776 |
| 8,051,034 | B2 * | 11/2011 | Mehta ................. | G06Q 40/00 707/973 |
| 8,060,645 | B1 | 11/2011 | Catania | |
| 9,781,576 | B2 * | 10/2017 | Jellison, Jr. ........ | H04W 4/06 |
| 10,440,097 | B1 * | 10/2019 | Raza ................... | H04L 12/2812 |
| 10,462,613 | B2 * | 10/2019 | Jellison, Jr. ........ | H04W 4/06 |
| 11,146,920 | B2 * | 10/2021 | Jellison, Jr. ........ | H04W 4/06 |
| 2001/0044850 | A1 | 11/2001 | Raz | |
| 2003/0014475 | A1 * | 1/2003 | Komori ............... | H04N 21/2221 709/200 |
| 2003/0093790 | A1 | 5/2003 | Logan | |

(Continued)

*Primary Examiner* — Jeong S Park
(74) *Attorney, Agent, or Firm* — Harness, Dickey & Pierce, P.L.C.

(57) ABSTRACT

A first device is associated with a first media station, and obtains content information associated with a first media item. The content information includes the first media item and first metadata associated with the first media item. The first device stores storing the content information, and obtains remote system information indicating one or more media items to be broadcast by a second media station. The remote system information includes second metadata associated with the one or more media items. The content information and the remote system information are correlated, and the first device conditionally transmits the first media item to a second device associated with the second media station in accordance with a result of the correlation.

20 Claims, 11 Drawing Sheets

(56) References Cited

U.S. PATENT DOCUMENTS

| | | | |
|---|---|---|---|
| 2005/0057724 A1* | 3/2005 | Patton | G06Q 30/02 352/40 |
| 2005/0078680 A1 | 4/2005 | Barrett | |
| 2005/0209927 A1 | 9/2005 | Aaltonen et al. | |
| 2006/0064716 A1 | 3/2006 | Sull | |
| 2006/0210254 A1* | 9/2006 | Yamashita | H04N 5/765 386/E5.069 |
| 2007/0141978 A1* | 6/2007 | Yamaguchi | H04N 21/2389 455/3.06 |
| 2008/0005637 A1 | 1/2008 | Chang | |
| 2010/0049735 A1 | 2/2010 | Hsu | |
| 2010/0274872 A1 | 10/2010 | Harrang et al. | |
| 2011/0138078 A1* | 6/2011 | Barnes | G06F 16/48 709/247 |
| 2011/0231431 A1 | 9/2011 | Kamiwada | |
| 2011/0239256 A1 | 9/2011 | Gholmieh | |
| 2012/0079578 A1* | 3/2012 | Dachiraju | H04N 21/8549 726/26 |
| 2012/0110119 A1* | 5/2012 | Levicki | H04N 21/8355 709/217 |
| 2013/0029642 A1* | 1/2013 | Sutedja | H04L 51/066 455/412.1 |
| 2013/0031215 A1* | 1/2013 | Macrae | H04L 65/80 709/219 |
| 2013/0009125 A1 | 4/2013 | Walker | |
| 2013/0091251 A1 | 4/2013 | Walker | |
| 2013/0132605 A1 | 5/2013 | Kocks et al. | |
| 2013/0132967 A1 | 5/2013 | Soundararajan | |
| 2013/0332953 A1 | 12/2013 | Howcroft | |
| 2014/0019891 A1* | 1/2014 | Borah | G06F 8/30 715/762 |
| 2014/0229580 A1* | 8/2014 | Yamagishi | G06Q 30/02 709/219 |

* cited by examiner

TRANSFERRING CONTENT TO OTHER MEDIA STATIONS

CROSS REFERENCE TO RELATED APPLICATIONS

The present U.S. Utility patent application claims priority pursuant to 35 U.S.C. § 120 as a continuation of U.S. Utility application Ser. No. 16/575,604 entitled "Segmented WANcasting," filed Sep. 19, 2019, scheduled to issue as U.S. Pat. No. 11,146,920 on Oct. 12, 2021, which is a continuation of U.S. Utility application Ser. No. 15/700,419 entitled "Segmented WANcasting," filed Sep. 11, 2017, now U.S. Pat. No. 10,462,613 issued on Oct. 29, 2019, which is a continuation of U.S. Utility application Ser. No. 13/857,213 entitled "Segmented WANcasting," filed Apr. 5, 2013, now U.S. Pat. No. 9,781,576 issued on Oct. 3, 2017, all of which are hereby incorporated herein by reference in their entirety and made part of the present U.S. Utility patent application for all purposes.

BACKGROUND OF THE INVENTION

Technical Field of the Invention

The disclosure relates generally to media broadcast systems, and more particularly to production and delivery of content to other media broadcast systems.

Description of Related Art

In the media broadcast industry, broadcast entities can include multiple processing systems, including one or more broadcast stations, one or more of which can be remotely-located from each other. Broadcast stations can broadcast content, including program content, voice-tracks, logs, and the like. Content can be produced at a broadcast station by recording content received from one or more sources, including program content received via reception equipment, including without limitation one or more antennas, network communication transceivers, satellite receivers, and the like.

Individual broadcast stations can produce content to be broadcasted independently. Independent production of content generally involves individual content production systems local to a broadcast station, including reception equipment and production systems to record content received via the reception equipment. As a result, a broadcast entity that includes multiple broadcast stations in a configuration similar to the above must operate and maintain reception equipment and production systems for each processing system. In addition, manual effort is required to operate and maintain each individual production system at each processing system. While some broadcast entities can provide for content at one processing system to be passed to another processing system via transmission of content between each processing system, content received at one processing system from another processing system in such a manner must still be recorded ("produced") by the receiving processing system. Furthermore, operation of the above systems, including operation and maintenance of systems used to receive, record, and utilize content requires manual intervention and equipment dedicated to recording the received content.

The above configurations, therefore, are less than ideal.

BRIEF DESCRIPTION OF THE SEVERAL VIEWS OF THE DRAWINGS

Aspects of this disclosure will become apparent upon reading the following detailed description and upon reference to the accompanying drawings, in which like references may indicate similar elements.

DETAILED DESCRIPTION OF THE INVENTION

The following is a detailed description of embodiments of the disclosure depicted in the accompanying drawings. The embodiments are described in such detail as to clearly communicate to one of ordinary skill how to make and use the claimed invention. However, the amount of detail offered is not intended to limit the anticipated variations of embodiments; on the contrary, the intention is to cover all modifications, equivalents, and alternatives falling within the spirit and scope of the present disclosure as defined by the appended claims.

Figure 1:
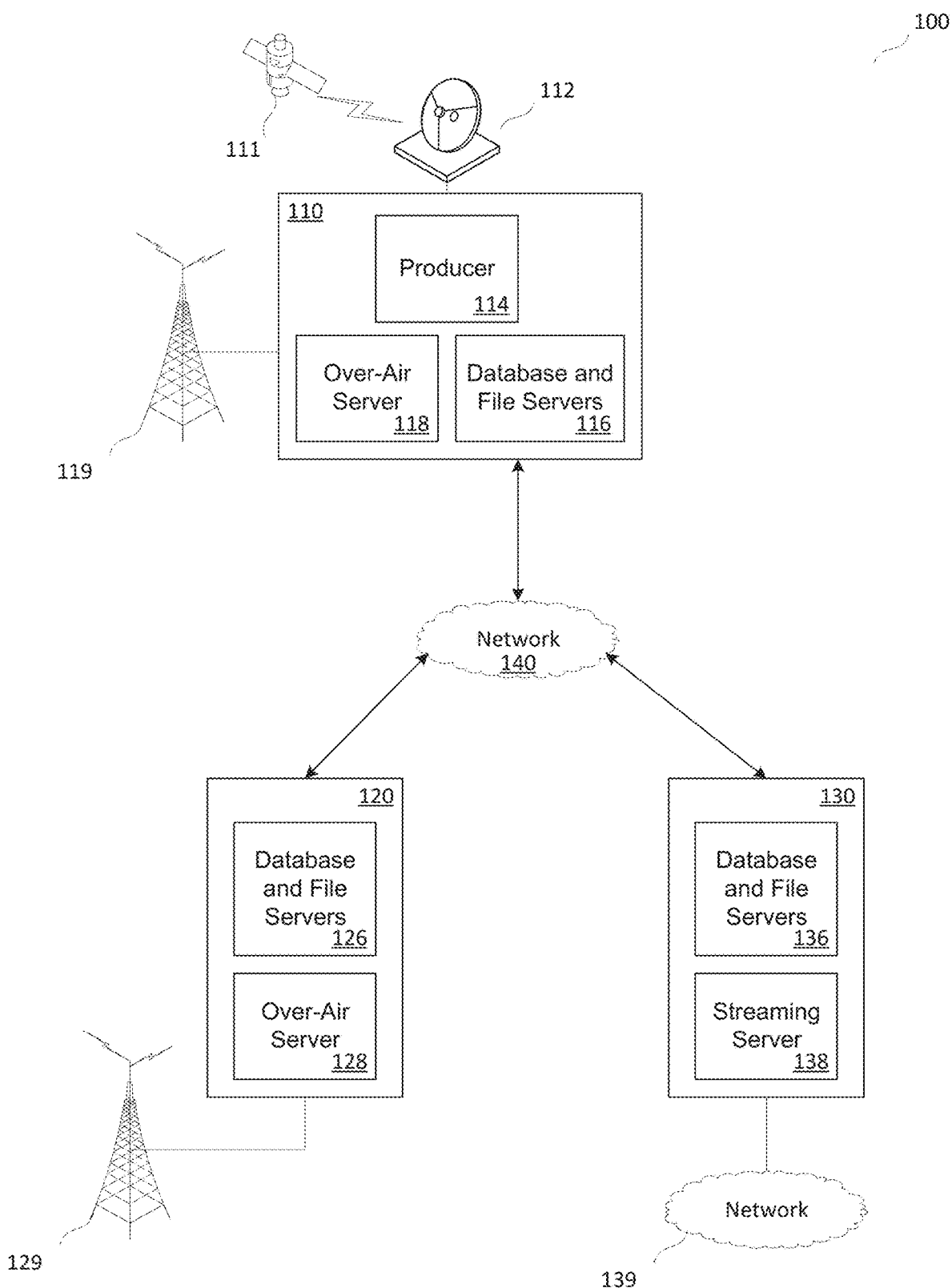
FIG. 1 is a block diagram illustrating a network of processing systems according to various embodiments of the present disclosure.

Referring first to FIG. 1, a network system 100 according to various embodiments of the present disclosure is illustrated and discussed. In some embodiments, a network system can include one or more processing systems communicatively coupled via a network. For example, in the illustrated embodiment, system 100 includes processing systems 110, 120, and 130, which are communicatively coupled via a network 140. Each processing system 110, 120, and 130 includes database and file servers 116, 126, and 136, which can store various data associated with broadcast functions of one or more processing systems in system 100, including, without limitation, content items, metadata associated with one or more content items, processing system broadcast logs, broadcast schedules, and the like. Content items can include, without limitation, some or all of media programs, advertisements, voice-tracks, and logs. Content items can also include one or more of audio and video content. For example, a content item can include an audio radio program that is broadcast from a broadcast station.

In some embodiments, a processing system includes one or more broadcast stations used to distribute content, with some or all system elements and subsystems co-located in a single physical facility. For example, in the illustrated embodiment, processing systems 110 and 120 can be radio broadcast stations that broadcast content over broadcast towers 119 and 129, respectively, as radio broadcasts; processing system 130 can be a broadcast station that streams content over a network. In some embodiments, a processing system provides at least some control of one or more processing systems. In some embodiments, processing systems can be remotely-located from each other, which can include being in different physical locations, including, without limitation, different broadcasting markets, cities, geographic regions, time zones, and the like. For example, a first broadcasting system can be a radio broadcast station used to broadcast radio content, and a second broadcasting system remotely-located from the first broadcasting processing system can be a network-streaming processing system that is located in a separate geographic region.

In some embodiments, a first processing system can include one or more broadcast stations co-located in the same processing system, where the broadcast stations in the processing system are communicatively coupled to some or all of each other and broadcast stations included in one or more separate processing systems, which can be remotely-located from the first processing system. For example, a processing system located at a single physical facility can include multiple broadcast stations that are communicatively coupled to multiple broadcast stations included in a separate processing system, which can be remotely-located in a separate physical facility. The separate processing system can, in some embodiments, be co-located with the first processing system in one or more common physical facilities. In some embodiments, processing systems can be communicatively coupled over a network other than the Internet. For example, in the illustrated embodiment, where processing systems are co-located in a single physical facility, network 140 can be one or more Local Area Networks (LAN).

In some embodiments, processing systems include one or more servers for distributing content. For example, in the illustrated embodiment, processing systems 110 and 120 include an over-air server 118, 128, respectively, that each provides content to be transmitted via a respective broadcast tower 119 and 129 associated with respective processing systems 110 and 120, while processing system 130 can include a streaming server 138 that can provide content to be streamed over a network 139, which can include streaming content over the Internet.

In some embodiments, one or more processing systems can include a producer, referred to herein interchangeably as a production machine, which can produce content items to be provided by one or more processing systems. For example, as shown in the embodiment illustrated in FIG. 1, processing system 110 includes a producer 114 which produces content. In some embodiments, producer can obtain information, including various content items, from various content sources, including, without limitation, broadcasts in other markets received via one or more networks, bulk content storage, and programming broadcast via a satellite, which can be received via a satellite receiver. For example, in the illustrated embodiment, processing system 110 is coupled to a satellite receiver 112 which receives content broadcast via satellite 111, such that content received at satellite receiver 112 is produced via producer 114 and provided via broadcast tower 119. In some embodiments, production can be scheduled to be performed without manual intervention. For example, in the illustrated embodiment, producer 114 can be scheduled to record, as one or more separate data files, content received via satellite receiver 112 over a certain time period. In some embodiments, production of a content item can include processing the received ("ingested") content item into a format suitable for one or more of storage in a database and distribution. For example, in the illustrated embodiment, a content item received via satellite receiver 112 can be recorded by producer 114 as a data file and stored in a computer-usable storage medium. Recording a content item can include saving the content item in a different format than the format in which it was received. For example, a content item received as an analog broadcast can be recorded as a data file in a digital format, including, without limitation, a ".wav" file format.

In some embodiments, content produced at one or more processing systems can be transferred to other processing systems via a connection over a network, such that the content is not produced at the other processing systems, via a process known as "WANcasting". As a result, some processing systems can receive produced content items via WANcasting, rather than producing the content items locally. In some embodiments, content items are transferred between a database at one processing system and a database at a second processing system. For example, in the illustrated embodiment, where processing systems 110, 120, and 130 are communicatively coupled via a network 140, content produced at processing system 110 via producer 114 can be transferred ("WANcasted") from processing system 110 to one or more of processing systems 120 and 130, such that processing systems 120 and 130 can distribute such transferred content independently of a requirement to produce the content locally to processing systems 120 and 130. In some embodiments, content produced at producer 114 is stored at processing system 110 in one or more database and file servers 116, and the content can be transferred from the database and file servers 116 at processing system 110 to database and file servers 126 and 136 at processing systems 120 and 130, respectively. Furthermore, in some embodiments, content received and produced at one processing system can be transferred to another broadcast station, independently of whether the transferring broadcast station includes a producer. For example, content produced via producer 114 can be transferred from processing system 110 to processing system 120, and such content can subsequently be transferred from processing system 120 to processing system 130. In another example, processing system 110 can manage transfers of content between processing systems 120 and 130.

In some embodiments, processing systems to which content can be transferred via WANcasting are mapped to each other such that a processing system is configured to access information associated with the various processing systems to which it is mapped, establish connections with the processing systems over one or more networks, and transfer content to the processing systems via the connection. In some embodiments, transferring content between processing systems via WANcasting involves copying a data file comprising a content item between two processing systems based on one or more of an IP address associated with one or more processing systems and a UDP protocol. Utilizing WANcasting to transfer content to a processing system can be accomplished based upon automated processes, such that the process of producing content at a first processing system and transferring the produced content to a receiving processing system's database without a need for manual intervention at one or both of the first processing system and the receiving processing system. Furthermore, in some embodiments, content received by a receiving processing system can be populated into a broadcast playlist without manual intervention, thereby enabling receipt and distribution of remotely-produced content without manual intervention at the receiving processing system.

Figure 2:
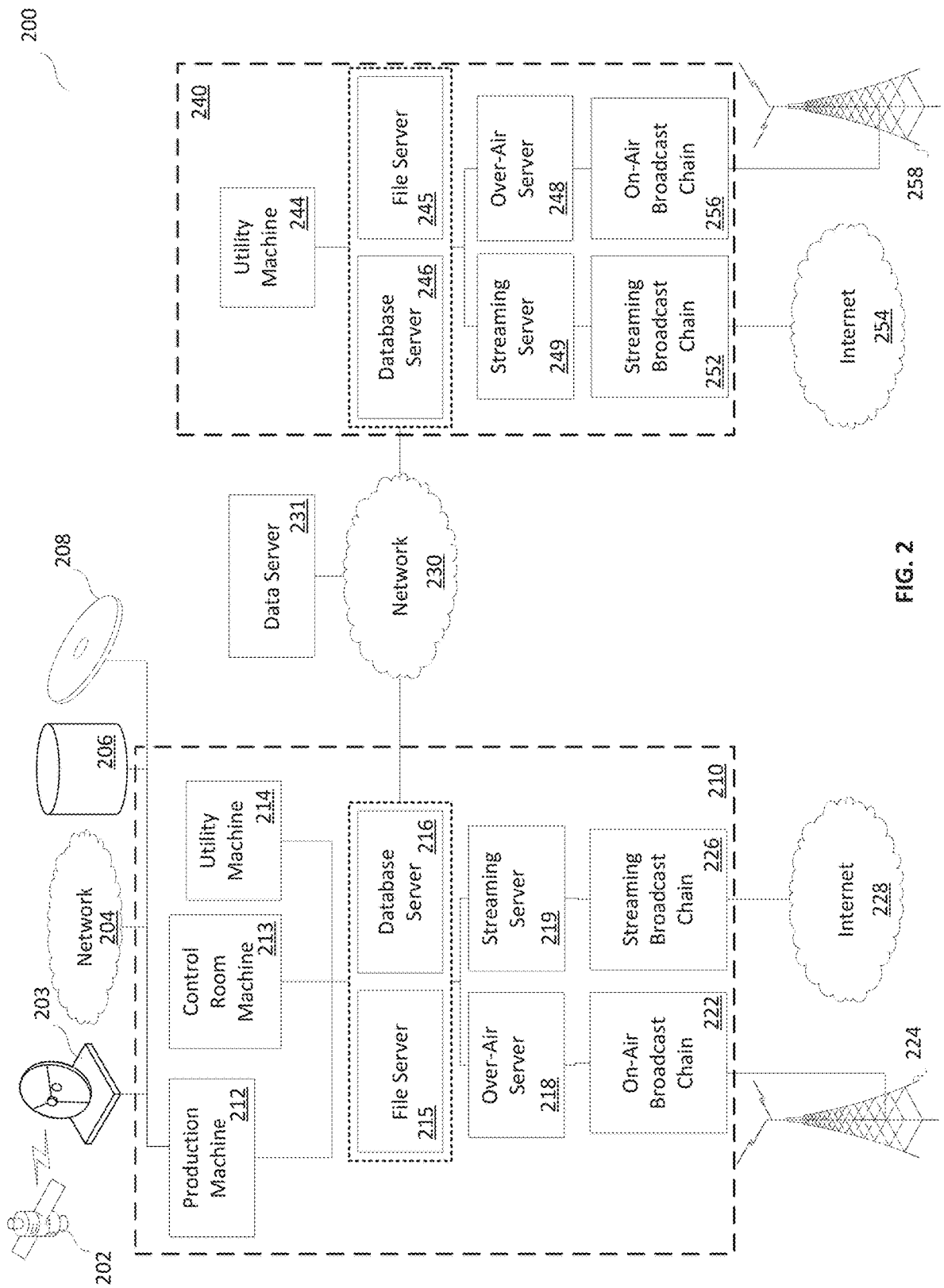
FIG. 2 is a block diagram illustrating processing systems in a network according to various embodiments of the present disclosure.

Referring to FIG. 2, a system 200 according to various embodiments of the present disclosure will be discussed. System 200 includes a first radio broadcast station 210 and a second radio broadcast station 240 that are communicatively coupled via a network 230, such that content can be transferred between the two broadcast stations via WAN-casting. Radio broadcast stations 210 and 240 can be included in one or more processing systems which can be remotely-located from each other. In some embodiments, broadcast stations 210 and 240 can be included in one or more processing systems which can be co-located, at least in part, in one or more physical facilities. The network 230 can be the Internet and can be communicatively coupled to a third entity, which can include a data server 231, where some information and controls related to the broadcast stations 210 and 240 can be located.

As shown in the illustrated embodiment, broadcast station 210 can include streaming broadcast chain 226, through which a streaming broadcast of content can be provided to a network such as Internet 228, on-air broadcast chain 222, through which content can be broadcast via a broadcast tower 224, and various content sources such as an individual source content 208, bulk content storage 206, programming from another market and received via network 204, and programming broadcast via satellite 202, which can be received via satellite receiver 203. The illustrated broadcast station 210 includes production machine 212, which receives content from network 204, bulk storage 206, individual source content 208; control room machine 213, and utility machine 214, each of which is connected to database server 216 and file server 215. The illustrated radio broadcast station 210 also includes over-air server 218, which provides content to on air broadcast chain 222; and streaming server 219, which provides content to streaming broadcast chain 226. File server 215 can store various data, including, without limitation, content items provided from production machine 212, utility machine 214, and control room machine 213. Database server 216 can store various data, including, without limitation, content metadata, broadcast schedules, and information associated with various other processing systems, including information associated with radio broadcast station 240 and data server 231. File server 215 and Database server 216 can provide data to one or both of over-air server 218 and streaming server 219. In some embodiments, one or more of the illustrated servers can be implemented as virtual servers implemented on the same hardware as another of the illustrated servers. Furthermore, various distributed processing techniques can be used to spread functionality of one or more of the illustrated servers across multiple different machines. For example, some processing techniques associated with one or more of the illustrated machines and servers of radio broadcast station 210 can be located at data server 231, such that some functionalities associated with system 200 are implemented from data server 231. In another example, some information can be stored on data server 231 and accessed by one or more machines and servers of radio broadcast station 210.

Radio broadcast station 210 can receive ("ingest") content to be played back, broadcasted, distributed, some combination thereof, or the like from various sources. For example, production machine 212 can obtain information from broadcasts in other markets, including content broadcast in the other markets, via network 204. Production machine 212 can also obtain content from database 206, which may be a database local to production machine 212, or local to another server or machine that is part of radio broadcast station 210. In some embodiments, database 206 can be maintained by a content provider separate from either radio broadcast station 210 or 204. For example, database 206 can be located on data server 231. Production machine 212 can also obtain content to be broadcast from individual sources, such as individual source content 208, which may include any of various non-volatile media storage elements, including but not limited to optical disks, e.g. compact discs (CDs), digital video disks (DVDs), various types of magnetic and electromagnetic storage media, or the like.

Production machine 212 can provide some or all of content to be distributed to file server 215. Production machine 212 can also provide some or all of data associated with the content, including content metadata, to one of file server 215 and database server 216. In addition to the content provided to file server 215 from production machine 212, satellite receiver 203 can also provide satellite content to be pro into a broadcast via over-air audio server 112 and streaming audio server 111. File server 215 and database server 216 can also receive content from control room machine 213. Control room machine 213 may include a studio in which a live content is being generated for broadcast, such as a talk show or other similar live program, but control room machine 213 can also provide content to file server 215 other than live content. Additionally, control room machine 213 can provide file server 215 and database server 216 with various control functions, and in some cases an operator can manually add or remove content that has previously scheduling for broadcast. Such manipulations of scheduling can involve interacting with a content playback schedule stored on a server, such as database server 216, where the playback schedule indicates one or more schedules for playback of content items by one or more radio broadcast stations. Thus, for example, an operator of control room machine 213 may determine that a previously scheduled content item in a particular daypart is not to be broadcast for any of various reasons. Upon making that determination, control room machine 213 can be used to send a signal to database server 216. In response to the signal, database server 216 can remove the content item from a previously-scheduled time slot. In some embodiments, the removed, or "bumped" content item is not delivered to over-air server 218 for on-air broadcast, nor is it delivered to streaming server 226 for streaming broadcast.

As used hereinafter, playback of a content item can include, without limitation, playing some or all of a content item on a device, and providing some or all of the content item for distribution by a processing system, including, without limitation, via on-air broadcast and streaming over a network. Playback can also include, without limitation, selecting and distributing selected portions of one or more content items, including clips, excerpts, and the like.

In various embodiments, content provided by streaming server 219 to streaming broadcast chain 226 is the same content provided by over-air server 218 to on air broadcast chain 222. In many instances, however, content provided to on air broadcast chain 222 and streaming broadcast chain 226 can vary, even though the length and timing of the content themselves are generally consistent with each other.

In some embodiments, radio broadcast station 210 can utilize WANcasting to transfer content produced at radio broadcast station 210 to radio broadcast station 240, such that radio broadcast station 240 receives content in a produced form independent of a capability, local to radio broadcast station 240, to produce content. For example, a media program content item received at satellite dish 203 of radio broadcast station 210 via satellite 202, and produced via production machine 212, can be transferred from radio broadcast station 210 to radio broadcast station 240 via a connection over network 230, such that the media program content item can be provided to one or more over-air and streaming servers 248, and 249, respectively, to be provided to respective broadcast chains 256 and 252 and broadcast from a broadcast tower 258 and provided via a network such as the Internet 254, respectively. In some embodiments, content and information stored in file servers 215 and database server 216 can be transferred to file server 245 and database server 246, respectively.

In some embodiments, transfers of content can be initiated based on information associated with a potential receiving processing system indicating an interest by the potential receiving processing system in receiving the content to be transferred. Such information can include various criteria associated with the potential receiving processing system, including preferences regarding certain parameters associated with content. For example, information associated with radio broadcast station 240 can include preferences for content of certain genres, artists, albums, lengths, some combination thereof, and the like. Criteria can also, in some embodiments, include scheduling information associated with the processing system. For example, information associated with radio broadcast station 240 can include a schedule for playback of certain content items at certain times over certain distribution channel, such as a scheduled broadcast of a particular nationally-syndicated radio program at a particular time over broadcast tower 258. In some embodiments, radio broadcast station 210 can transfer content to radio broadcast station 240 based on determining a correlation between content stored at one or more of file server 215 and database server 216 with information associated with radio broadcast station. For example, upon a determination that a particular content item stored in file server 215, with associated metadata stored in database server 216, is scheduled for playback at radio broadcast station 240 and is not currently stored at radio broadcast station 240, the particular content item and associated metadata can be transferred to the appropriate servers of radio broadcast station 240.

In some embodiments, the information associated with a processing system can be accessed by the system managing transfers of content between processing systems. For example, in the illustrated embodiment, where transfers of content from radio broadcast station 210 are controlled by a WANcasting module local to utility machine 214, information associated with radio broadcast station 240 can be accessed by the WANcasting module and analyzed to determine if any information, criteria, or the like associated with radio broadcast station 240 correlates with data stored in servers 215 and 216. Information associated with the radio broadcast station 240 can be accessed by some part of radio broadcast station 210, and a copy thereof can be stored locally to radio broadcast station 210, such as in database server 216. Accessed information can be analyzed for correlation at various times, including upon accessing, upon production of content at production machine 212, at certain time intervals, and the like. In some embodiments, utility machine 244, located at radio broadcast station 240, can manage some or all of WANcasting content items to radio broadcast station 240, utilizing transferred content items, and the like.

In some embodiments, information associated with various processing systems is located remotely from one or more of the processing systems. For example, in the illustrated embodiment, information associated with radio broadcast station 240, such as a content playback schedule for providing content to over air server 248 and streaming server 249, is located at data server 231 and is accessed by some part of radio broadcast station 210 to determine whether to transfer content from radio broadcast station 210 to radio broadcast station 240. Information can be provided to data server 231 through various means, including, without limitation, accessing information from radio broadcast station 240 by the data server 231, transferring information to the data server 231 by the radio broadcast station 240, and the like.

Figure 3:
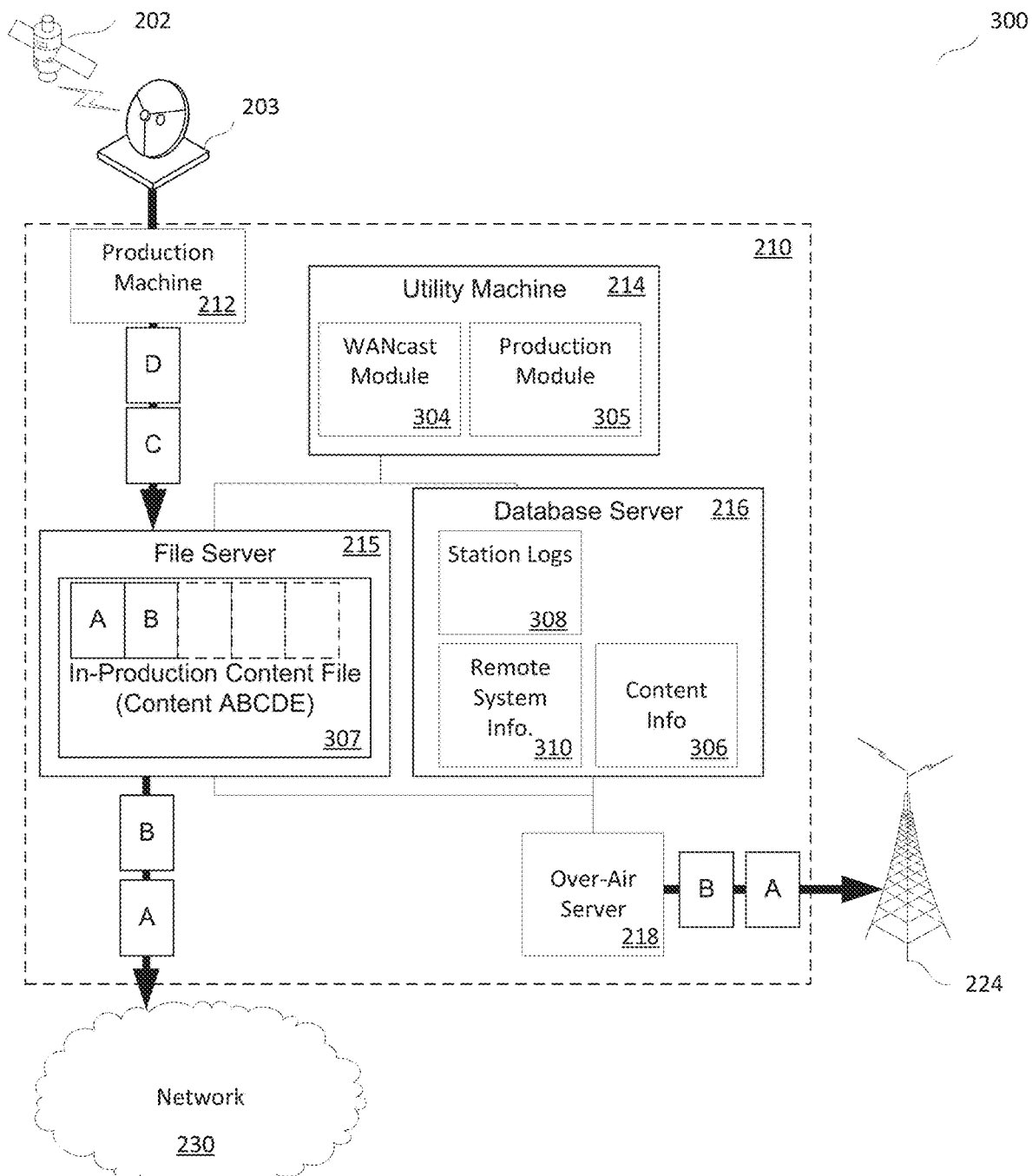
FIG. 3 is a block diagram illustrating production and utilization of content in a processing system according to various embodiments of the present disclosure.

Referring to FIG. 3, a system 300 according to various embodiments of the present disclosure will be discussed. System 300 includes radio broadcast station 210, discussed above with reference to FIG. 2, configured for "Segmented WANcasting", whereby content items can be transferred between processing systems via one or more connections over one or more networks as one or more content segments. Such a segmented transfer of content items, as discussed further below, can enable distribution of content items by multiple processing systems substantially concurrently with production of the content item at a single processing system. In some embodiments, substantially concurrent production and distribution can include distribution while production is ongoing, such that content is distributed within a relatively short time of being produced.

In some embodiments, a content item can be produced in portions. Such portions of a content item, referred to hereinafter as "content segments," can be discrete data files that comprise a portion of the content item, such that a collection of content segments produced in the production of a content item collectively comprise the entire content item. Production of a content item as multiple "content segments", referred to hereinafter as "segmented production", can include producing segments of a content item in a sequence and saving the content items in a file store to be appended, in a proper sequential order, to create the complete content item once all content segments comprising the content item are produced. For example, in the illustrated embodiment, a content item comprising content "ABCDE", broadcast via satellite 202 and received at radio broadcast station 210 via satellite receiver 203, can be produced by production machine 212. In the illustrated embodiments, portions "ABCD" of the content item "ABCDE" are at least received by satellite receiver 203, but portion "E" of the content item is not yet received or produced. The size of content segments can be predetermined; for example, where a content item is an audio program, a content segment of the content item can be 5 seconds of the content item. In some embodiments, each content segment of a content item includes unique portions of the content item; in some embodiments, at least some of the content segments have overlapping content.

WANcasting, including Segmented WANcasting, can be managed via one or more modules which can be located in one or more processing systems or distributed across multiple processing systems. For example, in the illustrated embodiment, utility machine 214 can include a WANcast module than manages transfer of content items, in full or in one or more segments, between processing system. As also shown, production module 305 can manage production of a content item, in full or in one or more segments. In some embodiments, the functionality of the WANcast module 304 and production module 305 can be combined in to a single module, distributed across multiple modules, located in different processing systems, or the like.

In some embodiments, each newly-produced content segment can be saved to file server 215, where it can be appended to the previously-produced content segments to "build" the content item. A data file 307 can comprise the appended content segments; while one of production and building of the full content item is ongoing, the data file can be flagged, via metadata or the like, as an "in-production" content item. Metadata can be associated with each segment to identify the content item with which the segment is associated, and the individual segment's proper placement with regard to one or more other content segments to properly build the content item. For example, metadata associated with content segment "C" of content item can identify the segment as a segment of content item "ABCDE" and identify that the content segment should be appended to follow segment "B" and precede segment "D". In some embodiments, metadata can identify the absolute position of a content segment in a sequence of content segments, including the order of content segments in which the present segment is produced. Metadata can also include markers associated with proper placement of advertisement spots, voice-tracks, and the like during playback of a content item. Metadata can also be associated to a data file 307 comprising some or all of the appended content segments to identify the status of building of the content item, and preserving information regarding segments comprising the content item.

In some embodiments, information associated with content, processing systems, and the like can be stored separately from the content itself. As shown in the illustrated embodiment, for example, database server 216 can include content information 306, which can include metadata associated with various content items, content segments, and the like, processing system logs 308 including schedules for distribution of content by radio broadcast station 210, and remote processing system information 310 including information related to processing systems remotely-located from radio broadcast station 210. Information stored on database server 216 and file server 215 can be utilized to determine whether to distribute content items stored at file server 215. For example, in the illustrated embodiment, processing system log 308 can indicate that content item ABCDE is to be broadcast on-air over substantially concurrently with its receipt via satellite receiver 203; a processing system associated with radio broadcast station 210 can respond to this determination by sending content item ABCDE, in full or in segments, to over-air server 218, to be broadcast via broadcast tower 224. In some embodiments, where a content item is to be distributed in segments, the content segments comprising the content item can be distributed, substantially in the order in which they are produced, as production of each segment is completed; in some embodiments, the segments can be stored in a file server, buffer, or the like until a sufficient amount of the content item is available locally to begin distribution of the content item. For example, as shown, where content item ABCDE is currently being produced in segments by production machine 212, and where content segments "A" and "B" have been stored in file server 215 as part of in-production content file 307, content segments "C" and "D" are produced but not yet appended in content file 307, and content segment "E" is yet to be produced, the content segments "A" and "B" are sent to over-air server 218 to be broadcast via broadcast tower 224, such that a buffer of at least two content segments is maintained.

In some embodiments, Segmented WANcasting enables transfer of content segments of a content item between various processing systems via one or more connections over one or more networks. Transfer of a content item from one processing system to another in segments can, in some embodiments, enable utilization of the content item by the another processing system while segmented production of the content item has yet to be completed at the first processing system. Utilization can include, without limitation, playback of some or all of the transferred content item and segments thereof. Furthermore, in some embodiments, such transfer can enable substantially concurrent distribution of a content item, currently under production at a first processing system, by multiple processing systems. For example, as shown in the illustrated embodiment, while production of content item "ABCDE" is yet to be completed, produced segments "A" and "B" can be transferred from file server 215 to other radio broadcast stations other than radio broadcast station 210 via a connection over a network 230. The other radio broadcast stations can be remotely-located from radio broadcast station 210, and transfer of segments of content item "ABCDE" to the other radio broadcast stations prior to completion of production of the content item at radio broadcast station 210 can enable the other processing systems to distribute at least some of the content item "ABCDE" before production of same is completed at radio broadcast station 210. In addition, as also shown in the illustrated embodiment, transfer of content segments "A" and "B" via network 230 can occur substantially concurrently with distribution of the same content segments via broadcast tower 224; as a result, other processing systems to which content segments "A" and "B" are transferred via network 230, including without limitation radio broadcast stations and network streaming processing systems, are enabled to distribute those content segments substantially concurrently with distribution of the same content segments by radio broadcast station 210. Metadata associated with one or more of the content item, content segments, and the transfer itself can be transferred via network 230, via one or more connections. In some embodiments, substantially concurrent distribution and production of content segments of a content item can include distribution of a content segment of a content item while production of other content segments of the content item is ongoing. For example, where content segments of content item "ABCDE" are being produced in order from "A" to "E", and content segment "B" is produced, substantially concurrent distribution of content segments of content item "ABCDE" can include, without limitation, distributing content segment "B" at one or more remote processing systems while production of content item "C" is ongoing at a first processing system. In some embodiments, substantially concurrent distribution and production can include distributing a content segment, without limitation, distributing content segment "B" at one or more remote processing systems and a local processing system before production of content item "D" is completed at the first processing system. In some embodiments, simultaneous distribution, transfer, production, and the like can include performance of one or more of distribution, transfer, production, and the like at one or more processing systems within a certain time interval, which can include, without limitation, simultaneous performance and performance of one function within a predetermined time interval of another performance of another function. In some embodiments, delays on performance of a function at one processing system can be used to ensure substantially-concurrent performance of one or more functions at one or more processing systems. For example, delays imposed distribution of content, produced at radio broadcast station 210, by the radio broadcast station 210, such as via a buffer, can enable distribution of the content segment by multiple radio broadcast stations, network streaming processing systems, and the like to occur simultaneously with radio broadcast station 210. In some embodiments, content segments can be managed to be transferred in substantially the same order in which the content items are produced, properly ordered to build the full content item, and the like.

In some embodiments, processing systems to which content segments are transferred can be determined via information associated with the processing systems. Such information can be access from various sources, including databases associated with the processing systems themselves, a processing system separate from the processing systems, or the like. For example, WANcast module 304 can access criteria associated with other processing systems from the database servers of the remote processing system, where such criteria can include content playback schedules for each of the processing systems, and analyze each processing system's playback schedule against information 306, such as metadata, associated with content items, complete or in-production, stored at file server 215. Upon determining a correlation between one or more aspects of a content item stored, in-production or complete, at file server 215 and a criterion associated with a processing system, transfer of the content item, in full or in content segments, can be initiated.

In some embodiments, information associated with other processing systems can be stored locally 310 in database server 310. The information can be accessed based upon one or more triggers, according to a time interval, intermittently, or the like. For example, content playback schedules of other processing systems can be accessed in response to initiation of local production of a content item. The information can also be provided by the remote processing systems without specific prompting.

Figure 4:
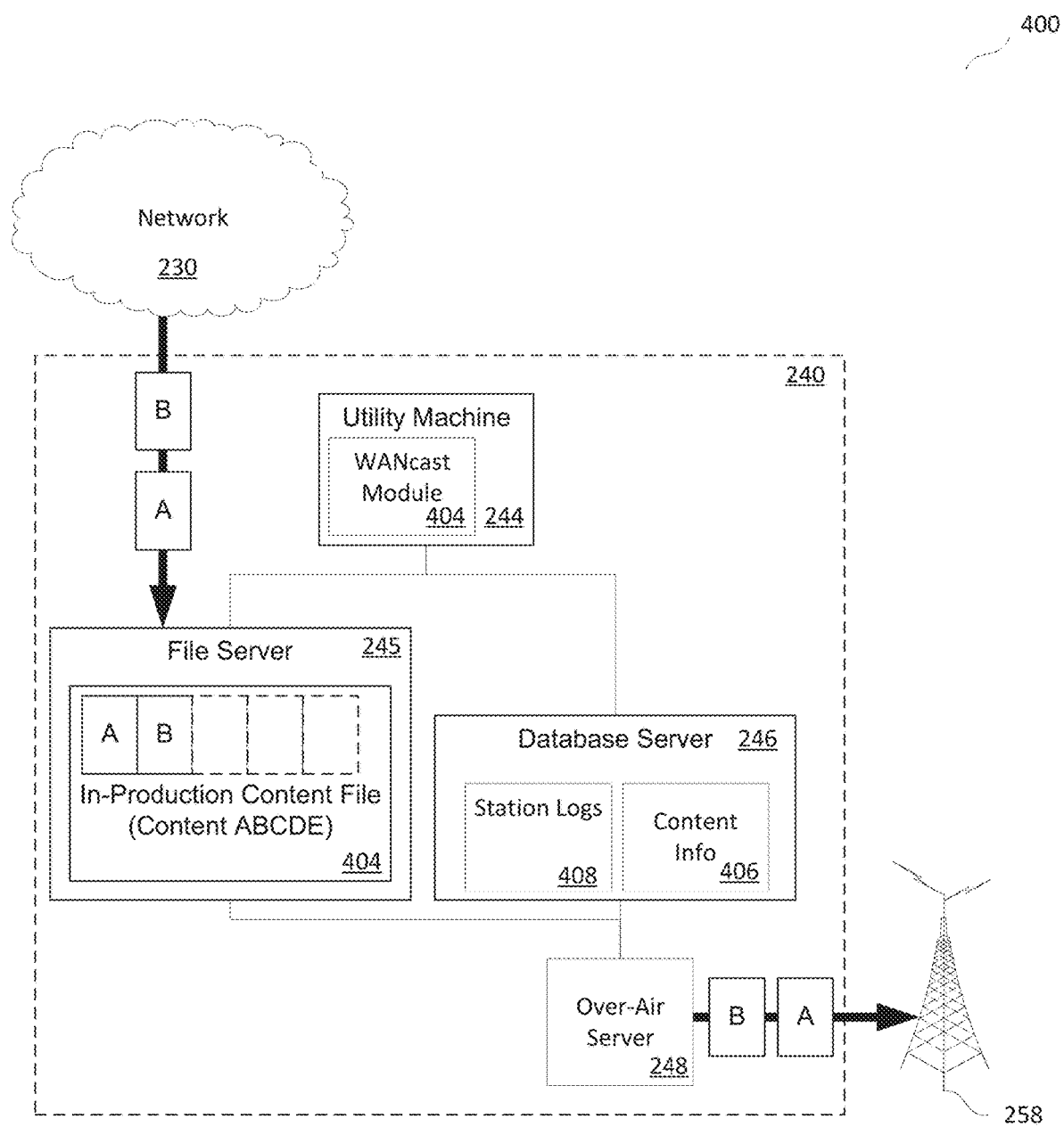
FIG. 4 is a block diagram illustrating receipt and utilization of content in a processing system according to various embodiments of the present disclosure.

Referring to FIG. 4, a system 400 according to various embodiments of the present disclosure will be discussed. System 400 includes radio broadcast station 240, discussed above with reference to FIG. 2, configured for "Segmented WANcasting" of content from radio broadcast station 210 via network 230, as illustrated and discussed above with reference to FIG. 2 and FIG. 3. With reference to Segmented WANcasting as illustrated in FIG. 3, FIG. 4 illustrates Segmented WANcasting of at least a portion of content item "ABCDE" via network 230.

As discussed above, Segmented WANcasting enables transfer of a content item in content segments. In some embodiments, a content item to be transferred to a processing system can be determined based upon a correlation between the content item and the "interests" of a potential recipient processing system, where such "interests" can be determined from information associated with the potential recipient processing system, including content playback schedules, preferences, and the like. For example, as shown in the illustrated embodiment, radio broadcast station 240 includes processing system logs 408 and content information 406 stored in database server 246. Processing system logs 408 can include content playback schedules and other information associated with radio broadcast station 240. Content information can include, without limitation, metadata associated with various content stored in file server 245 and content preferences associated with radio broadcast station 240.

In some embodiments, information associated with a processing system can be accessed remotely from other processing systems. For example, the processing system logs 408 and content information 406 stored at database server 246 can be accessed by other processing systems via network 230 to determine whether to transfer content available at other processing systems to radio broadcast station 240. One or more of the other processing systems can include a processing system configured to manage Segmented WANcasting between multiple other processing systems. In some embodiments, information associated with a processing system can be actively provided by the processing system with other processing systems. For example, radio broadcast station 240 can provide processing system logs 408 and content information 406 with other processing systems, processing systems, and the like via network 230 according to a time interval, based on certain events, some combination thereof, or the like. An event that can trigger providing such information by radio broadcast station 240 can include updates or changes to one or more of files stored in file server 245 and database server 246.

In some embodiments, management of receipt and processing of content transferred to a processing system is performed by a WANcasting module. For example, in the illustrated embodiment, WANcast module 404, located in utility machine 244, can control receipt and processing of content segments transferred to radio broadcast station 240 via network 230. Such control can involve managing properly storing received content segments and metadata, properly building one or more content items from received content segments, and utilizing received content segments based on local processing system logs, preferences, and the like. For example, in the illustrated embodiment, radio broadcast station 240 is in the process of receiving content segments of content item "ABCDE", discussed further above with reference to FIG. 3. In the illustrated embodiment, content segments "A" and "B" are received via a connection over network 230 and are stored in file server 245 as part of a data file 404 associated with the content item "ABCDE". As additional content segments of content item "ABCDE" are received via network 230, the content segments can be appended to previously-received content segments stored in data file 404 to build the content item. For example, as shown in the illustrated embodiment, as content segments "A" and "B" are received at radio broadcast station 240, they are appended in the proper order as part of data file 404 to build content item "ABCDE".

In some embodiments, metadata associated with content item "ABCDE" may be received via network 230 before, during, and after receipt of one or more content segments. For example, metadata may be received, prior to receipt of the first content segment "A" at radio broadcast station 240, indicating the imminent transfer of content segments associated with a content item, and instructions for accepting a transfer connection by radio processing system 240, creating file entries in databases 245 and 246 for the content segments and metadata, and instructions to flag the data file 404 as "in-production" until further notice. Metadata can also be sent after transfer of all content segments, the metadata indicating that all content segments are sent, instructing the "in-production" data file of appended content segments to be re-flagged as complete, instructions to close the connection, some combination thereof, or the like.

In some embodiments, metadata may not include some or all of the above indications, and WANcast module 404 can perform the necessary functions in response to transfer of content segments. For example, WANcast module 404 may control flagging of data files in file server 245 based on whether content segments are being received via network 230 over a connection, whether the connection has been opened or closed, or the like.

In some embodiments, a processing system can utilize content segments of a content item received via Segmented WANcasting upon receipt of such content segments. Such utilization can include distributing the received content segments, as part of distribution of the content item, substantially concurrently with receipt of the content segments, such that distribution of at least part of a content item initiates at a local processing system prior to receipt of all of the content segments comprising the content item at the local processing system. For example, in the illustrated embodiment, where content segments "A" and "B" of content item "ABCDE" are received via a connection over network 230, the content segments can be sent to over-air server 248 to be broadcast over broadcast tower 258. Such distribution of content segments can be initiated based upon processing system logs. For example, where content item "ABCDE" is scheduled in processing system logs 408 for broadcast via broadcast tower 258 at approximately the same time that the first content segments "A" and "B" of content item "ABCDE" are received over network 230, radio broadcasting system may initiate broadcast of content item "ABCDE" by sending content segments of content item "ABCDE" to over-air server for broadcast as soon as possible following receipt, or upon a delay. Such a delay may be imposed to "build up", via receipt, processing, or the like, a predetermined amount of the content item, in file server 245, a buffer, some combination thereof, or the like, prior to initiating broadcasting. In some embodiments, utilization of received content items can involve analyzing one or more of the content segments received and the data file 404 to identify clips, excerpts, and the like of one or more content items to distribute.

Viewed together, FIG. 3-4 can be appreciated to illustrate that, in some embodiments, Segmented WANcasting of a content item from a first processing system to second processing systems can enable utilization by one or more second processing systems prior to completion of production of the content item at the first processing system. For example, in the illustrated embodiments of both FIG. 3 and FIG. 4, radio broadcast station 210 and radio broadcast station 240 are shown to distribute at least the first content segments "A" and "B" of content item "ABCDE" before all of the content segments of the content item have been produced by production machine 212 at radio broadcast station 210.

It will be appreciated that various systems can be used to implement the teachings set forth herein, and are not limited to the systems discussed with reference to FIGS. 1-4. For example, although at least one embodiment includes separate file servers and database servers, similar functionality can be provided using a single, integrated device or system having one or more local or distributed processing, storage and communication elements. Thus, although embodiments including separate file servers and database servers are primarily discussed herein, other embodiments can be implemented without the need for cooperation between separate servers. In another example, although at least one embodiment includes a module for controlling at least some of WANcasting in a utility machine coupled to file servers and database servers, similar functionality can be provided with a module for controlling at least some of WANcasting in one or more of the file servers and database servers.

Figure 5:
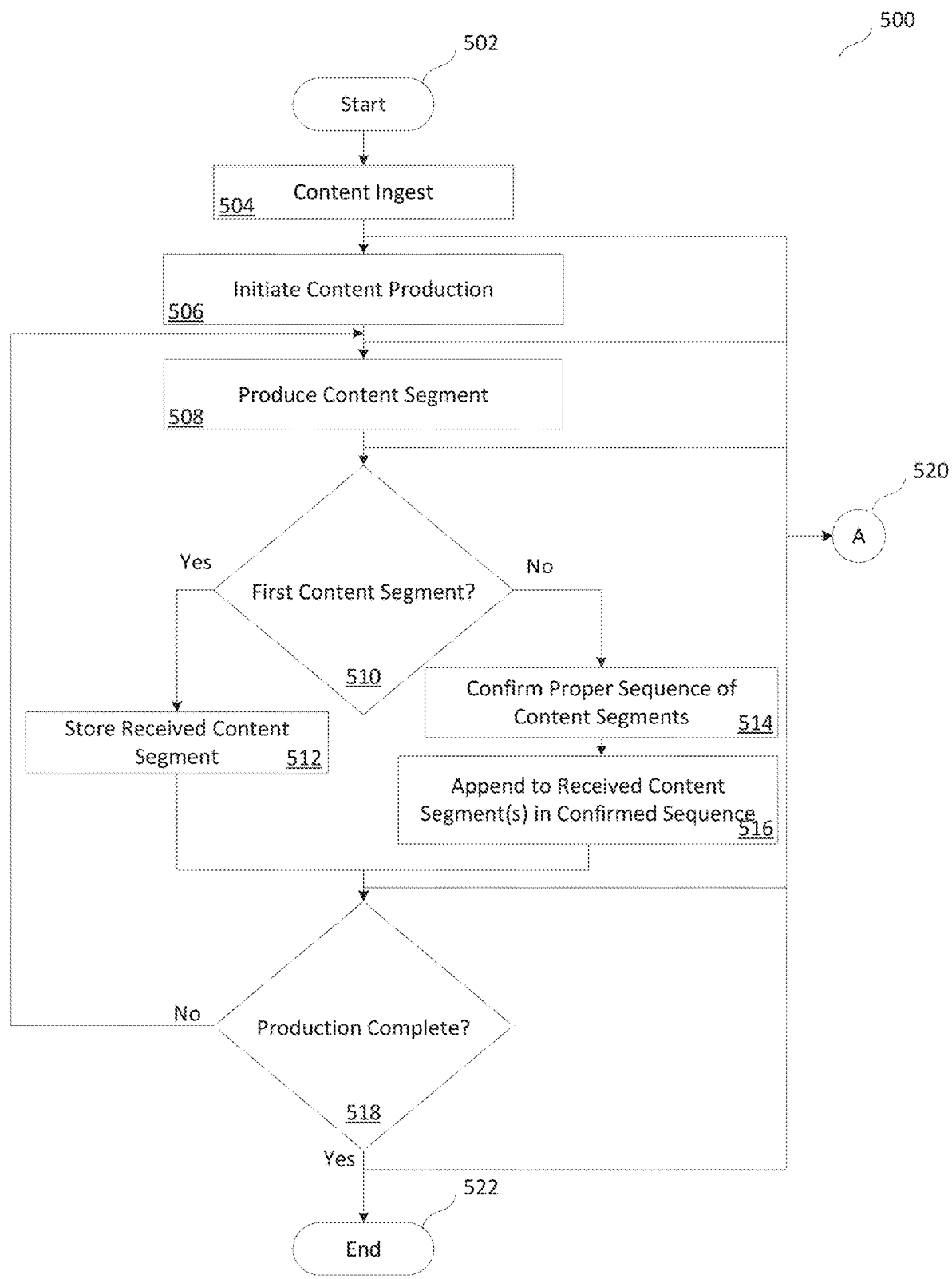
FIG. 5 is a flow diagram illustrating a process for producing content according to various embodiments of the present disclosure.

Turning now to FIG. 5, a flow diagram illustrating a process 500 according to various embodiments is illustrated and discussed. Process 500, which begins at block 502, illustrates segmented production of a content item at a first processing system. As shown in block 504, process 500 can include an "ingest" of information, which can include one or more content items, from various sources, including, without limitation, broadcasts in other markets received via one or more networks, bulk content storage, and programming broadcast via a satellite, which can be received via a satellite receiver. In some embodiments, ingest of content into a first processing system can be scheduled to occur without manual intervention. Triggers of such ingest can include, without limitation, a specific time interval and a predetermined scheduling. For example, the first processing system can schedule ingest of a specific content item that is to be broadcast via satellite, such that ingest via a satellite receiver communicatively coupled to the first processing system is scheduled to substantially coincide with the satellite broadcast. In some embodiments, a content ingest can be triggered by a specific event, including, without limitation, introduction of a physical storage medium that includes a content item to the first processing system.

As shown by block 506, process 500 can include initiation of content production. Production can include production of a content item that is in the process of being ingested via one or more various means, such as a content item being received via a satellite receiver. Production can also include production of a content item that has been completely received, such as a content item received via an introduced physical storage medium. In some embodiments, production of a content item can include processing the received ("ingested") content item into a format suitable for one or more of storage in a database and distribution. For example, a content item ingested via a satellite receiver can be recorded as a data file and stored in a computer-usable storage medium. Recording a content item can include saving the content item in a different format than the format in which it was received. For example, a content item received as an analog broadcast can be recorded as a file in a digital format, including, without limitation, a ".wav" file format. In some embodiments, production can include segmented production of a content item, such that the content item is "produced" in segments.

As shown by block 508, process 500 can include producing a content segment of a content item under production. A segment can represent a portion of the content item under production, where the size of the segment is predetermined. For example, where ingestion of a content item is an ongoing process of receiving content via a satellite receiver over a certain time period, such as receipt of a live broadcast, segmented production can include producing the content item is segments representing sequential time periods, of a predetermined length, of the ingestion of the content item. Production of a content item, or segments thereof, can include generation of metadata associated with one or more of the content item and content segments, including information indicating the proper ordering of the produced content segments to build the content item from the content segments. As shown by block 510 and 512, if the produced content segment is the first-produced content segment of a content item under production, the produced content segment can be stored. Storage can occur at one or more locations and can be local or remotely-located from a processing system performing some or all of process 500. The content segment can be stored as part of a data file representing the content item itself during production, whereby subsequently-produced content segments are appended to the first-produced content segment to build the content items.

As shown in blocks 514 and 516, process 500 can include responding to a determination that a produced content segment is not the first-produced content segment of a content item under production by confirming the proper order, or sequence, of the produced content segment with respect to other previously-produced content segments, and appending the produced content segment to the previously-produced content segments to build the content item. In some embodiments, where each content segment is produced in sequence of playback of the content item and comprises a unique portion of the content item, appending can include simply combining two or more content items in substantially the proper order of playback or production of the content item. Where each content segment includes at least a portion of content common with one or more content segments, such that the content "overlaps" between two segments, appending content segments can involve a process of combining the content segments such that common content is not repeated in the "built" content item.

As shown in block 518, if the produced content segment is not the last content segment of the content item to be produced, the process repeats at block 508 with production of another content segment, else process 500 can proceed to complete 522.

As represented by element "A" 520, at various points in process 500, a separate process for Segmented WANcasting of a content item under production, discussed further below, can be initiated. Initiation of Segmented WANcasting, as represented by element "A" 520, can be at various points in process 500, including, without limitation, following initial ingest of content at block 504, following initiation of content production at block 506, following production of one or more content segments at block 508, following storage of one or more content segments at blocks 512 and 516, and following completion of content production at block 518.

Figure 6:
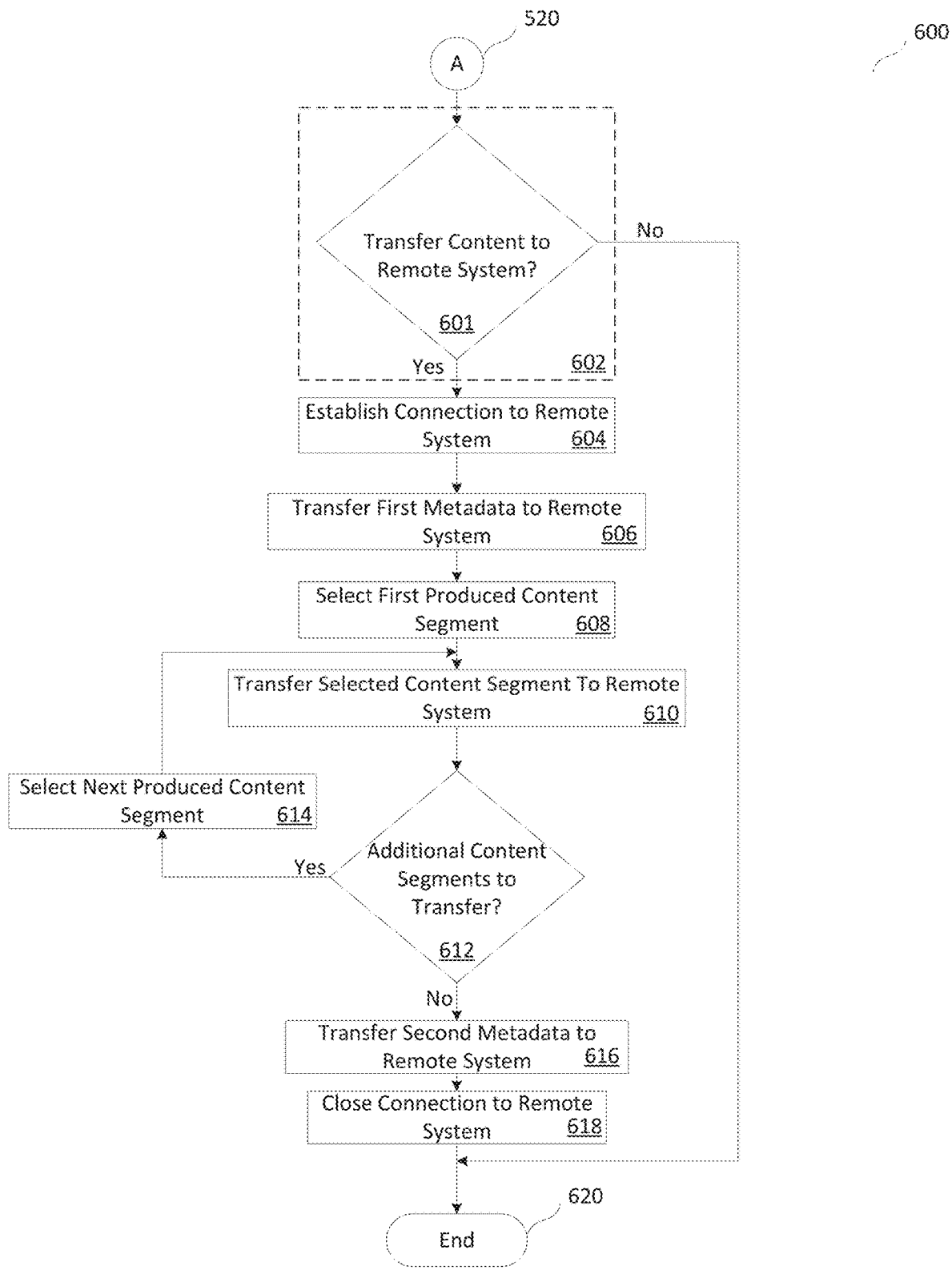
FIG. 6 is a flow diagram illustrating a process for transferring content segments from one processing system to another processing system according to various embodiments of the present disclosure.

Turning now to FIG. 6, a flow diagram illustrating a process 600 according to various embodiments is illustrated and discussed. Process 600, which begins at element "A" 520, as discussed above with reference to FIG. 5, illustrates Segmented WANcasting of a content item at a first processing system. As also discussed above with reference to FIG. 5, process 600 for Segmented WANcasting of a content item can be performed substantially concurrently with segmented production of the content item, as illustrated by process 500 in FIG. 5, such that at least part of a content item can be transferred to other processing systems prior to completion of production of the content item at a first processing system. Process 600 can be performed by one or more processing systems, which can include, without limitation, the first processing system at which production of the content item occurs.

As shown by blocks 601 and 602, process 600 can include determining whether a content item is to be transferred to a processing system remote from the first processing system. Processes included in determining whether to transfer content to a remote system, as shown by block 602, are discussed in further detail below. Upon determining that a content item is to be transferred to a remote system, as shown by block 604, process 600 can include establishing one or more connections to the remote system. The connection, which can be established over one or more networks, including the internet, is used to transfer some or all of a content item to the remote system over the network. For example, where a radio broadcast station determines that a content item currently under local production is to be transferred to a remotely-located second radio broadcast station, a connection between the first and second radio broadcast stations can be established over a network. The connection can be established between certain elements of processing systems. For example, a connection can be established between two respective file servers, database servers, or some combination thereof between the two radio broadcast stations. Multiple connections can be established concurrently for transfer of different data. For example, a first connection can be established for transfer of a content item, and a second connection can be established for transfer of metadata associated with the content item. In some embodiments, a single connection can be established for transmission of the content item and associated metadata.

As shown by block 606, process 600 can include transferring first metadata to the remote processing system. First metadata can include information indicating, to the remote system, a content item to be transferred to the remote system via an established connection, and additional information relevant to the transfer including, without limitation, number of content segments to be transferred, advertisement spot markers associated with the content item, and instructions for creating a data file to build the content item from transferred content segment.

As shown in block 608, process 600 can include selecting a first produced content segment of a content item to be transferred to the remote processing system. In some embodiments, the first produced content segment of a content item is the first content segment produced by a first processing system during production of the content item. In some embodiments, the first produced content segment is the first content segment in a sequential ordering of content segments substantially concurrent with the proper order in which playback of the content segments would substantially approximate playback of the content item. In some embodiments, the first produced content segment can be both of the above. For example, where a content item "ABCDE" is produced via production of content segments in order from "A" to "E", the first produced content segment can be content segment "A". In some embodiments, production of all content segments comprising a content item may not be completed when the first produced content segment is selected.

As shown in block 610, process 600 can include transferring a selected content segment of a content item from a first processing system to a remote processing system. As shown in block 612, process 600 can include determining whether additional content segments are available to be transferred to the remote processing system. If so, as shown by block 614, process 600 can include selecting a next-produced content segment and transferring the selected content segment to the remote processing system. In some embodiments, multiple processed content segments may be available for selection; content segments can be selected, in some embodiments, according to an order, such as the sequential ordering discussed above.

As shown in block 616, if no additional content segments of a content item are available for transfer, process 600 can include transfer of second metadata to the remote processing system. Second metadata can include, without limitation, various information associated with the content segments transferred, the content item collectively comprised, in full or in part, by the transferred content segments, and the transfer itself. For example, second metadata can include changes to parameters associated with the content item, such as source, genre, artist, title, and the like. Second metadata can also include indications regarding the transfer, including without limitation instructions for appending the transferred content segments to build at least some of the content item, instructions for flagging or re-flagging a data file containing the built content item as complete, instructions for ending the connection, some combination thereof, or the like. It may be appreciated that information transferred as second metadata can be transferred as first metadata, as discussed further above, and vice versa.

As shown in blocks 618 and 620, process 600 can include closing a connection to the remote processing system and ending the process. In some embodiments, a connection is dedicated to a specific transfer of specific content segments of a content item and is maintained only until the transfer of the content items and associated metadata is completed.

Figure 7:
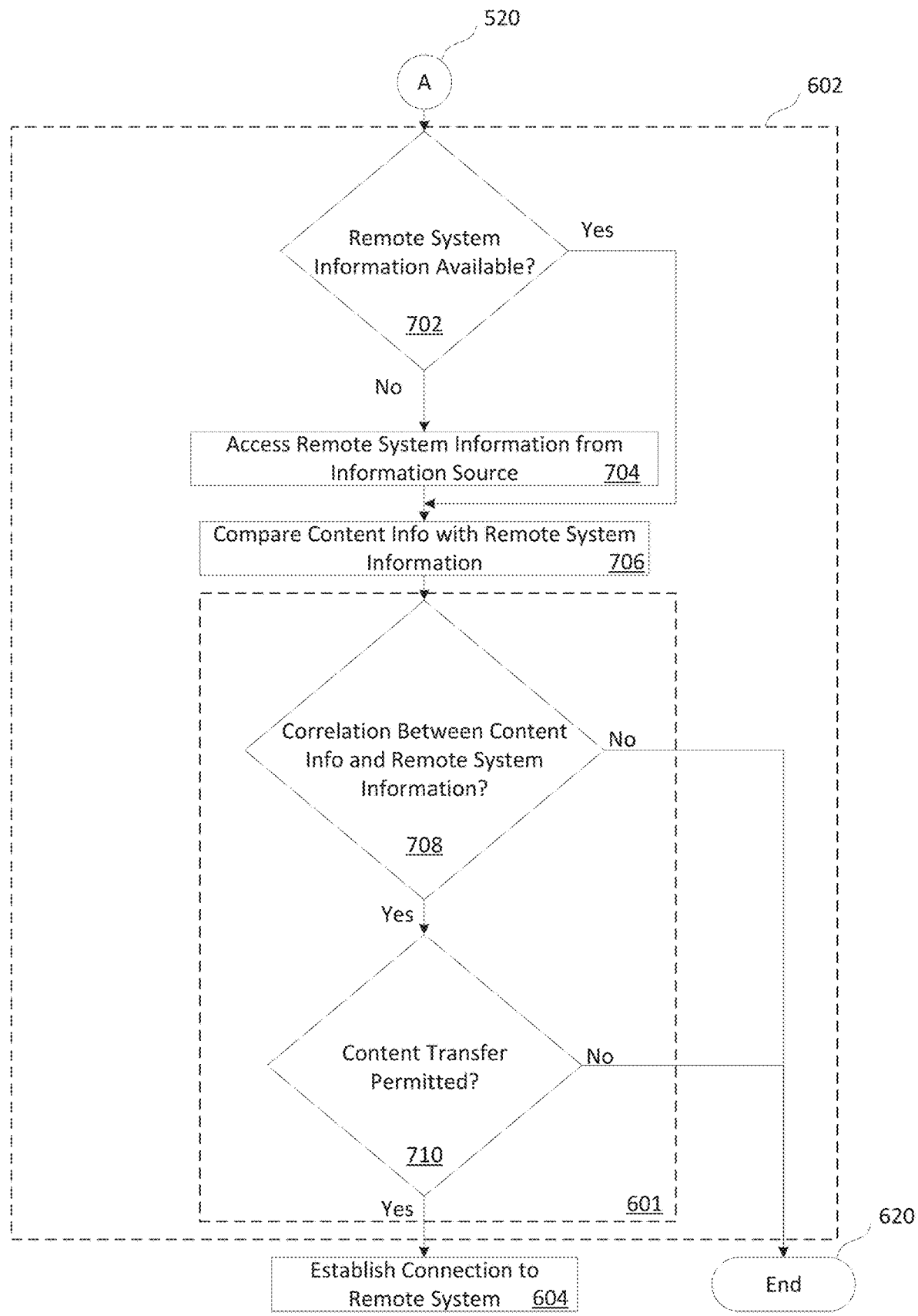
FIG. 7 is a flow diagram illustrating a process for determining whether to transfer content segments from one processing system to another processing system according to various embodiments of the present disclosure.

Turning now to FIG. 7, a flow diagram illustrating, in greater detail, elements of process 600, discussed above with reference to FIG. 6, according to various embodiments is illustrated and discussed. FIG. 7 illustrates, in greater detail, a portion 602 of process 600 following initiation of the process from element "A" 520 and preceding either establishing a connection to a remote processing system 604 or ending the process 620. The portion 602 includes a decision 601 regarding whether to transfer a content item to a remote processing system.

As shown by block 702, process portion 602 can include determining whether information associated with one or more remote processing systems is available. As discussed further above, such information associated with a processing system can include, without limitation, content playback schedules, preferences of the processing system regarding content, indicated by selected parameters than can be compared with content metadata, and the like. In some embodiments, determining whether such information is available can involve determining whether the information is stored in one or more database locations. As shown by block 704, process portion 602 can include responding to a lack of available information by accessing the information from an information source. Such an information source can include a database associated with the remote processing system itself, a separate database configured to store information associated with one or more separate processing systems, etc. Accessed information can be stored in a database to be analyzed. In some embodiments, the information is stored in a database server local to a WANcast module used to analyze the information to compare with content information associated with content items stored at one or more processing systems.

As shown by block 706, process portion 602 can include comparing available information associated with one or more remote processing systems with content information associated with various content items. Such comparison can involve comparing various metadata associated with content items, including, without limitation, titles, publishers, artists, content sources, and the like, with various information, which can include, without limitation, content playback schedules, processing system content preferences, and the like. As shown by blocks 708 and 710, upon determination that at least some content information associated with one or more content items correlates with information associated with a remote processing system, and transfer of at least some of that content item to the remote processing system is permitted, process portion 601 can be satisfied to determine that at least a portion of the content item is to be transferred to the remote processing system, as discussed further above with reference to FIG. 6. In some embodiments, transfer of certain content items can be restricted to excerpts, time-limited portions, and selected portions of the content items. Transfer can also be restricted based on parameters associated with one or more of the processing system from which the content item is to be transferred, the processing system to which the content item is to be transferred, a network over which the content item is to be transferred, some combination thereof, or the like.

Figure 8:
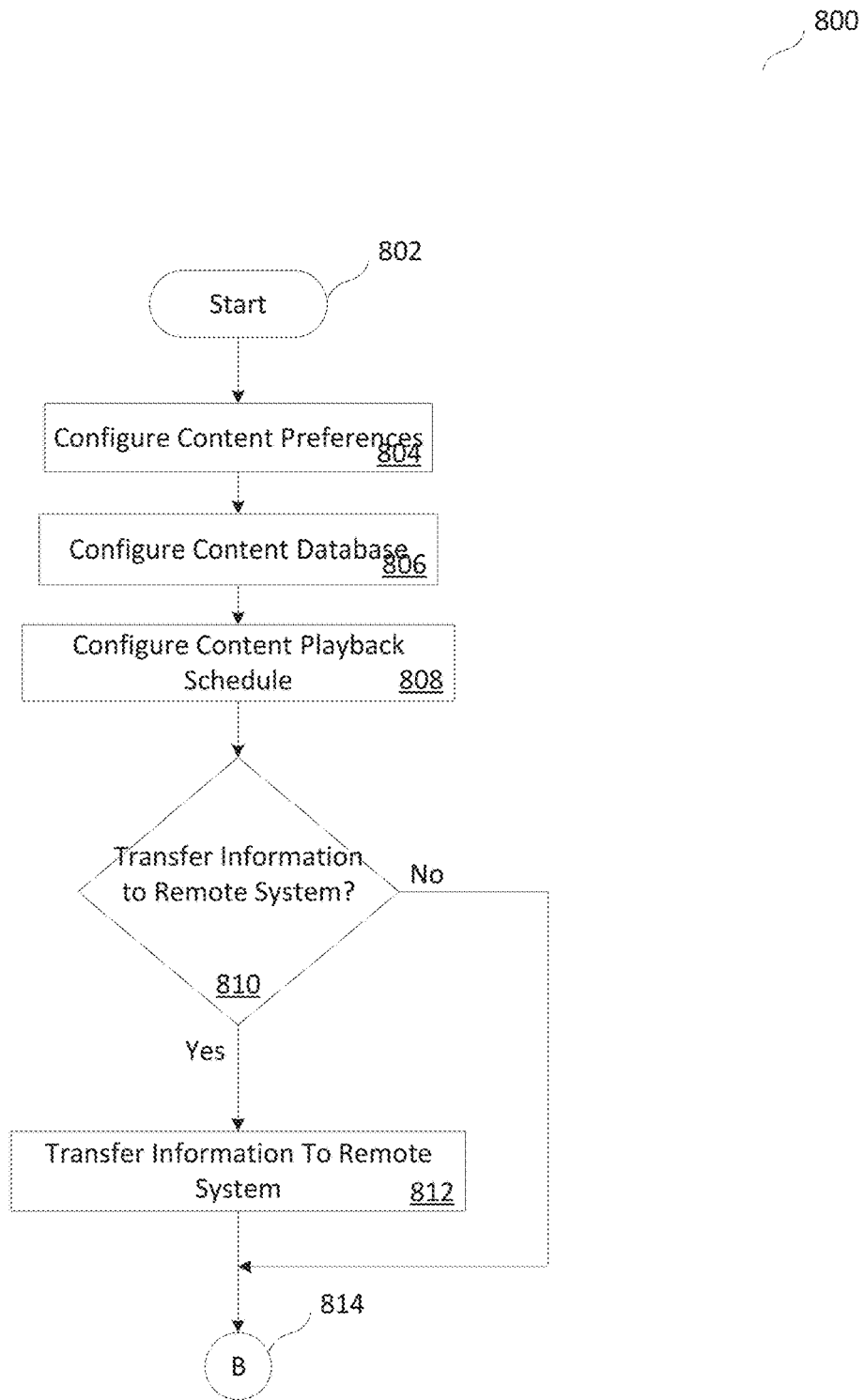
FIG. 8 is a flow diagram illustrating a process for configuring processing system information according to various embodiments of the present disclosure.

Turning now to FIG. 8, a flow diagram illustrating a process 800 according to various embodiments is illustrated and discussed. Process 800, which begins at block 802, illustrates configuration of a processing system for receipt of a content item via Segmented WANcasting. As shown in block 804, process 800 can include configuring various content preferences associated with the processing system. Preferences can include parameters associated with content items that one or more operators of the processing system are "interested" in receiving at the processing system. For example, content items of a specific set of genres, programs, artists, and the like can be parameters included in content preferences.

As shown in block 806, process 800 can include configuring a content database associated with a processing system. Configuring the content database can include cataloguing all content items currently stored locally to the processing system, to ensure that content items already stored locally are not transferred to the processing system, thereby precluding redundancies in content items.

As shown in block 808, process 800 can include configuring a content playback schedule associated with a processing system. A content playback schedule can be a schedule of distribution of content by the processing system via one or more media, including radio broadcast and internet streaming. In some embodiments, a content playback schedule can be a list of content items associated with specific time slots in a daypart, day of the week, and the like. In some embodiments, a content playback schedule can include a playlist of content to be broadcast.

In some embodiments, one or more of content preferences, content database information, and content playback schedules can be information ("criteria") associated with a processing system. The information can be used by other remote processing systems to determine whether to transfer content items to the local processing system, and, if so, which content items to transfer. As shown in block 810 and 812, process 800 can include determining whether to transfer the information associated with the processing system to remote processing systems. In some embodiments, remote processing systems can access the information from the database, via a network connection, at any time. The information can also be transferred by the processing system itself to one or more remote processing systems. For example, in a network of processing systems, a single processing system may store criteria associated with all of the processing systems in the network, so that any processing system attempting to determine whether to transfer a content item can access the single processing system to access information associated with multiple processing systems. As shown in Element "B" 814, process 800 can, in some embodiments, proceed to another process, discussed further below. In some embodiments, upon determining whether to transfer information to remote processing systems at block 810, process 800 ends.

Figure 9:
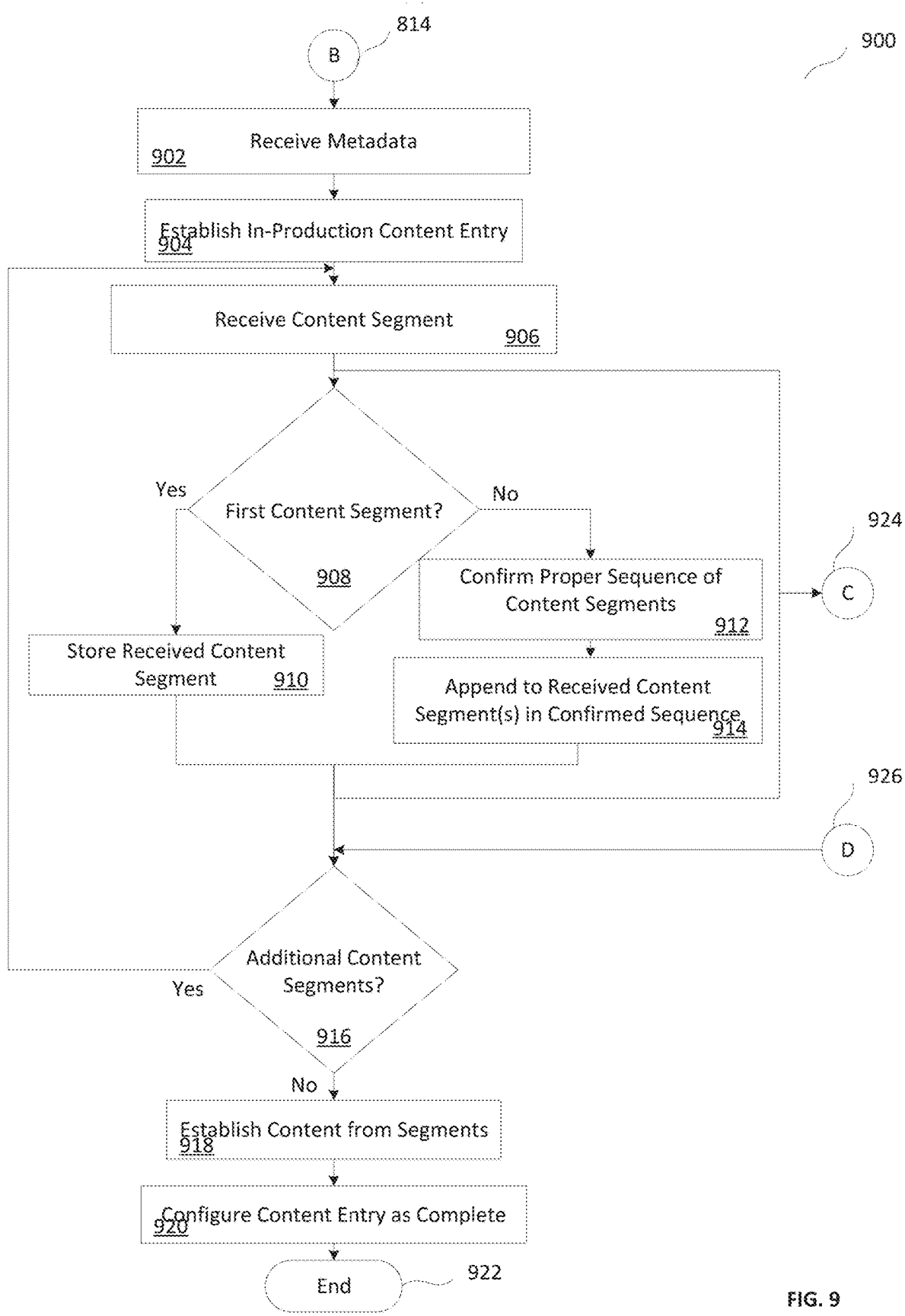
FIG. 9 is a flow diagram illustrating a process for receiving content according to various embodiments of the present disclosure.

Turning now to FIG. 9, a flow diagram illustrating a process 900 according to various embodiments is illustrated and discussed. Process 900, which begins at element "B" 814, as discussed above with reference to FIG. 8, illustrates Segmented WANcasting of a content item to a processing system from one or more remote processing systems.

As shown by blow 902, process 900 can include receiving metadata from a remote processing system. As discussed above with reference to FIG. 6, metadata can include information indicating, to the remote system, a content item to be transferred to the remote system via an established connection, and additional information relevant to the transfer including, without limitation, number of content segments to be transferred, advertisement spot markers associated with the content item, and instructions for creating a data file to build the content item from transferred content segment. Metadata can include instructions for building a data file local to the processing system receiving a content item, where the data file is used to build the content item from received content segments.

As shown by block 904, process 900 can include establishing an "in-production" content entry. The entry can be a data file stored locally to the processing system to which a content item is to be transferred, as indicated by received first metadata. The data file can be flagged with an indicator that the content item is being built ("in-production").

As shown by block 906, process 900 can include receiving a content segment of a content item at a processing system. In some embodiments, the content segment is received via a connection established over a network between the processing system and a remote processing system, such that content segments of the content item are transferred between the processing systems via the connection. As shown by blocks 908 and 910, if the received content segment is the first-received content segment of a content item, the received content segment can be stored. Storage can involve adding content included in the received content segment to the established "in-production" content entry to build the content item, such that subsequently-received content segments can be appended to the first-received content segment to build the content item.

As shown in blocks 912 and 914, process 900 can include responding to a determination that a received content segment is not the first-received content segment of a content item by confirming the proper order, or sequence, of the received content segment with respect to other previously-received content segments, and appending the received content segment to the previously-received content segments to build the content item. In some embodiments, where each content segment is received in sequence of playback of the content item and comprises a unique portion of the content item, appending can include simply combining two or more content items in substantially the proper order of playback or production of the content item in the "in-production" content entry. Where each content segment includes at least a portion of content common with one or more content segments, such that the content "overlaps" between two segments, appending content segments can involve a process of combining the content segments such that common content is not repeated in the "built" content item.

As shown in block 916, if the received content segment is not the last content segment of the content item to be produced, the process repeats at block 906 with receipt of another content segment, else process 900 can include establishing the received content item from the received content segments and configuring the content entry as complete, as shown by blocks 918 and 920. Establishing a content item from received content segments can involve appending some or all received content items to build the content item. In some embodiments, where the "in-production" content entry includes combinations of content included in received content segments, such that upon receipt of all content segments the content entry includes a combination of content from the content segments that is substantially similar to the content item, the content entry can be re-flagged from "in-production" to "complete" to indicate that it is a data file of the completed content item.

As represented by element "C" 924, at various points in process 900, a separate process for utilization of a content item transferred to a processing system, at least in part, via Segmented WANcasting, discussed further below, can be initiated concurrently with process 900. Initiation of the utilization, as represented by element "C" 924, can be at various points in process 900, including, without limitation, following receiving of one or more content segments at block 906 and following storage of one or more content segments at blocks 910 and 914. In some embodiments, upon completion of the utilization process prior to completion of process 900, the utilization process can re-join process 900 as represented by element "D" 926.

Figure 10:
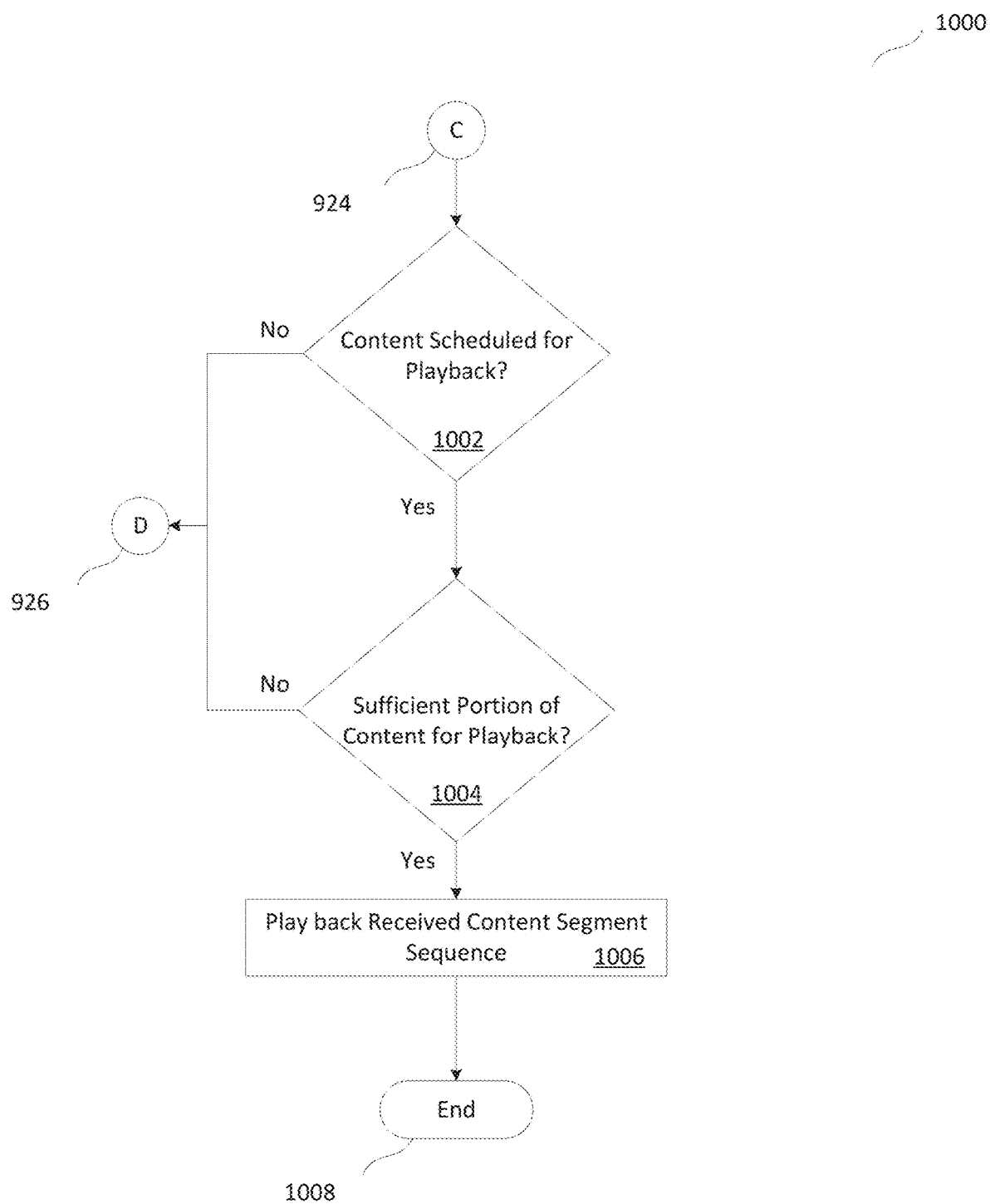
FIG. 10 is a flow diagram illustrating a process for utilizing received content according to various embodiments of the present disclosure.

Turning now to FIG. 10, a flow diagram illustrating a process 1000 according to various embodiments is illustrated and discussed. Process 1000, which begins at element "C" 924, as discussed above with reference to FIG. 9, illustrates utilization of some or all of a content item transferred to a processing system via Segmented WANcasting. As also discussed above with reference to FIG. 9, process 1000 for utilization of some or all of a content item can be performed substantially concurrently with transfer of some or all of the content item via process 900 in FIG. 9, such that at least part of a content item can be utilized by a processing system prior to completion of transfer of the content item to the processing system from other processing systems. For example, as shown by block 1002, process 1000 can include determining whether a content item currently being transferred to a processing system in process 900 is currently scheduled for playback, via broadcast over a broadcast tower, streaming over a network, or some other distribution medium. Such a determination can include comparing metadata of the content item with a content playback schedule associated with the processing system. As shown in block 1004, if a content item is scheduled for playback, a determination is made whether a sufficient portion of the content is received and processed at the processing system to initiate playback. For example, processing system parameters may require that a minimum amount of a content item be received and stored in one or more local data files, such that a content buffer can be maintained during distribution of the content item. Where only a small portion of the content item is received at the processing system, a sufficient portion of content for playback may be determined to be absent.

As shown in block 1006, process 1000 can include responding to a determination that a content item is both currently scheduled for playback and available in sufficient portions for playback by playing back one or more content segments comprising some or all of the content item. As discussed further above, playback can include distribution of a content item via one or more distribution media, playing some or all of the content item on a device, some combination thereof, or the like. In some embodiments, playback can include selecting specific portions, clips, excerpts, etc. of a content item, or content segments thereof, for playback.

As shown in blocks 1002, 1004, and element "D" 926, if the content item being received in process 900 is either not currently scheduled for playback or not available in sufficient amount for playback, the process 1000 can proceed back to process 900 via element "D" 926. In some embodiments, where multiple content segments are received and processed in process 900, process 1000 can be performed after each new content segment is received, such that a determination of whether the content item is scheduled for playback and present in sufficient amount can be made multiple times during receipt and processing of the content item in segments at a processing system.

Figure 11:
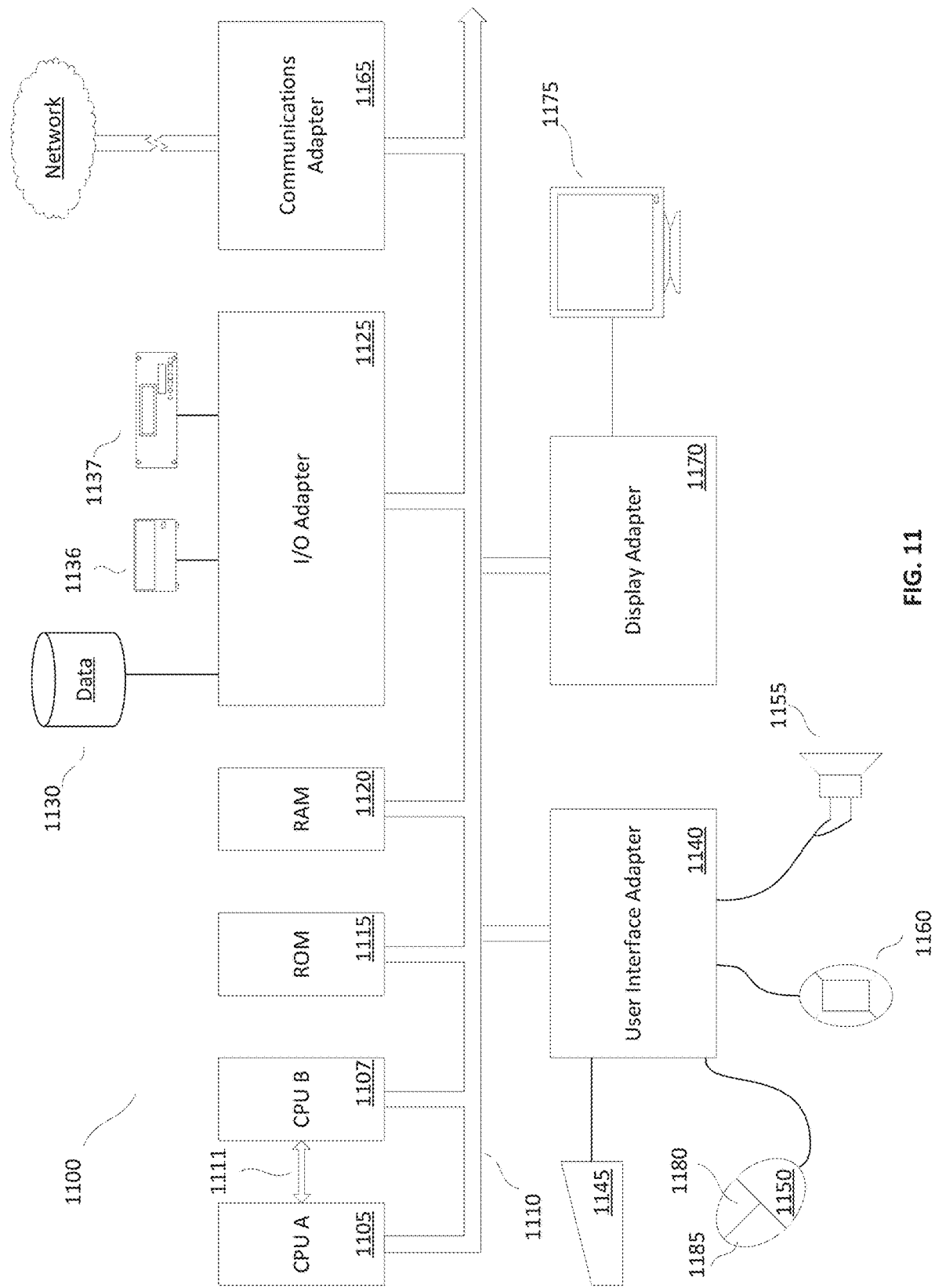
FIG. 11 is a block diagram illustrating a processing system according to various embodiments of the present disclosure.

Referring now to FIG. 11, a high-level block diagram of a processing system is illustrated and discussed. In some embodiments, a processing system can include one or more computers, referred to herein as computing devices. For example, in the illustrated embodiment, processing system 1100 can be included in a single computing device. In another example, some or all of processing system 1100 can be distributed across multiple computing devices. In some embodiments, a processing system includes one or more processors. For example, as shown in the illustrated embodiment, processing system 1100 includes one or more central processing units, such as CPU A 1105 and CPU B 1107, which may be conventional microprocessors interconnected with various other units via at least one system bus 1110. CPU A 1105 and CPU B 1107 may be separate cores of an individual, multi-core processor, or individual processors connected via a specialized bus 1111. In some embodiments, CPU A 1105 or CPU B 1107 may be a specialized processor, such as a graphics processor, other co-processor, or the like.

In some embodiments, a processing system includes one or more memory elements. For example, as shown in the illustrated embodiment, processing system 1100 includes random access memory (RAM) 1120; read-only memory (ROM) 1115, wherein the ROM 1115 could also be erasable programmable read-only memory (EPROM) or electrically erasable programmable read-only memory (EEPROM); and input/output (I/O) adapter 1125, for connecting peripheral devices such as disk units 1130, optical drive 1136, or tape drive 1137 to system bus 1110; a user interface adapter 1140 for connecting keyboard 1145, mouse 1150, speaker 1155, microphone 1160, or other user interface devices to system bus 1110; communications adapter 1165 for connecting processing system 1100 to an information network such as the Internet or any of various local area networks, wide area networks, telephone networks, or the like; and display adapter 1170 for connecting system bus 1110 to a display device such as monitor 1175. Mouse 1150 has a series of buttons 1180, 1185 and may be used to control a cursor shown on monitor 1175.

It will be understood that processing system 1100 may include other suitable data processing systems without departing from the scope of the present disclosure. For example, processing system 1100 may include bulk storage and cache memories, which provide temporary storage of at least some program code in order to reduce the number of times code must be retrieved from bulk storage during execution.

The present disclosure has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present disclosure may have also been described, at least in part, in terms of one or more embodiments. An embodiment of the present disclosure is used herein to illustrate the present disclosure, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

Various disclosed embodiments can be implemented in hardware, software, or a combination containing both hardware and software elements. Some embodiments can be implemented in software, which includes but is not limited to firmware, resident software, microcode, etc. Some embodiments can be realized as a computer program product, and may be implemented as a computer-usable or computer-readable medium embodying program code for use by, or in connection with, a computer, a processor, or other suitable instruction execution system.

For the purposes of this description, a computer-usable or computer readable storage medium can be any tangible medium that can contain, store, communicate, or transport the program for use by or in connection with an instruction execution system, apparatus, or device. By way of example, and not limitation, computer readable media may comprise any of various types of computer storage media, including volatile and non-volatile, removable and non-removable media implemented in any suitable method or technology for storage of information such as computer readable instructions, data structures, program modules, or other data. Computer-usable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer, computing device, and the like.

While particular combinations of various functions and features of the present disclosure have been expressly described herein, other combinations of these features and functions are likewise possible. The present disclosure is not limited by the particular examples disclosed herein and expressly incorporates these other combinations.

What is claimed is:

1. A method comprising:
   obtaining, at a first device included in a first media broadcast station, content information associated with a first media item, wherein the content information includes the first media item and first metadata associated with the first media item;
   storing the first media item by the first device;
   obtaining, at the first device, remote system information indicating one or more media items to be broadcast by a second media broadcast station, wherein the remote system information includes second metadata associated with segments of the one or more media items;
   correlating the content information and the remote system information; and
   conditionally transmitting the first media item from the first media broadcast station to the second media broadcast station in accordance with a result of the correlating.

2. The method of claim 1, wherein obtaining the remote system information includes:
   obtaining the remote system information from the second media broadcast station.

3. The method of claim 1, wherein obtaining the remote system information includes:
   obtaining the remote system information from a database that stores information associated with both the first media broadcast station and the second media broadcast station.

4. The method of claim 1, further including:
   determining whether transmitting the first media item from the first device to the second media broadcast station is authorized; and
   transmitting the first media item from the first media broadcast station to the second media broadcast station in response to determining that transmitting is authorized.

5. The method of claim 4, wherein:
   determining whether transmitting the first media item from the first device to the second media broadcast station is authorized is based on restriction parameters.

6. The method of claim 4, further including:
   determining whether at least one of the one or more media items includes the first media item; and
   in response to determining that the one or more media items includes the first media item, transmitting the first media item from the first device to the second media broadcast station.

7. The method of claim 1, further including:
   determining not to transmit the first media item from the first media broadcast station to the second media broadcast station in response to determining, based on the remote system information, that the first media item is currently stored at the second media broadcast station.

8. A system comprising:
   a first computing device included in a first media broadcast station;
   a second computing device included in a second media broadcast station located remotely from the first media broadcast station, the second media broadcast station being coupled to the first computing device via a communications network;
   the first computing device configured to:
   obtain content information associated with a first media item, wherein the content information includes the first media item and first metadata associated with the first media item;
   store the first media item;
   obtain remote system information indicating one or more media items to be broadcast by the second media broadcast station, wherein the remote system information includes second metadata associated with the one or more media items;
   correlate the content information and the remote system information; and
   conditionally transmit the first media item from the first media broadcast station to the second media broadcast station in accordance with a result of correlating.

9. The system of claim 8, wherein the second computing device is configured to:
   transmit the remote system information from storage in a first database server associated with the second media broadcast station to a second database server associated with the first media broadcast station.

10. The system of claim 8, wherein the first computing device is configured to:
    obtain the remote system information from a common database that stores information associated with both the first media broadcast station and the second media broadcast station.

11. The system of claim 8, wherein the first computing device is configured to:
    determine whether transmitting the first media item from the first computing device to the second computing device is authorized; and
    transmit the first media item to the second computing device in response to determining that transmitting is authorized.

12. The system of claim 11, wherein the first computing device is configured to:
    determine whether transmitting the first media item from the first computing device to the second computing device is authorized is based on restriction parameters.

13. The system of claim 11, wherein the first computing device is configured to:
    determine whether at least one media item of the one or more media items includes the first media item; and in response to determining that the one or more media items includes the first media item, transmit the first media item to the second computing device.

14. The system of claim 8, wherein the first computing device is configured to:
determine to forego transmitting the first media item from the first computing device to the second computing device in response to determining, based on the remote system information, that the first media item is currently stored at the second computing device.

15. A computing device included in a first media broadcast station, the computing device comprising:
a processor;
memory coupled to the processor and configured to store a program of computer executable instructions, the program of computer executable instructions including:
at least one instruction to obtain content information associated with a first media item, wherein the content information includes the first media item and first metadata associated with the first media item;
at least one instruction to store the first media item;
at least one instruction to obtain remote system information indicating one or more media items to be broadcast by a second media broadcast station, wherein the remote system information includes second metadata associated with the one or more media items;
at least one instruction to correlate the content information and the remote system information; and
at least one instruction to conditionally transmit the first media item from the first media broadcast station to the second media broadcast station in accordance with a result of the correlating.

16. The computing device of claim 15, wherein the at least on instruction to obtain the remote system information includes:
at least one instruction to obtain the remote system information from the second media broadcast station.

17. The computing device of claim 15, wherein the at least on instruction to obtain the remote system information includes:
at least one instruction to obtain the remote system information from a database that stores information associated with both the first media broadcast station and the second media broadcast station.

18. The computing device of claim 15, wherein the program of computer executable instructions further includes:
at least one instruction to determine whether transmitting the first media item to the second media broadcast station is authorized; and
at least one instruction to transmit the first media item to the second media broadcast station in response to determining that transmitting is authorized.

19. The computing device of claim 18, wherein the program of computer executable instructions further includes:
at least one instruction to determine whether transmitting the first media item to the second media broadcast station is authorized is based on restriction parameters.

20. The computing device of claim 18 wherein the program of computer executable instructions further includes:
at least one instruction to determine whether at least one media item of the one or more media items includes the first media item;
at least one instruction to determine, based on the remote system information, that the first media item is currently stored at the second media broadcast station; and
at least one instruction to forego transmitting the first media item to the second media broadcast station in response to determining that the first media item is currently stored at the second media broadcast station.

* * * * *